(12) United States Patent
He et al.

(10) Patent No.: US 7,894,469 B2
(45) Date of Patent: Feb. 22, 2011

(54) GENERIC SONET/SDH TIME SLOT SELECTION ALGORITHM

(75) Inventors: Min He, San Jose, CA (US); Saranagati Chatterjee, San Jose, CA (US); Puneet Jain, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 423 days.

(21) Appl. No.: 11/253,647

(22) Filed: Oct. 20, 2005

(65) Prior Publication Data

US 2007/0091913 A1 Apr. 26, 2007

(51) Int. Cl.
*H04L 12/43* (2006.01)
(52) U.S. Cl. ..................................... 370/458
(58) Field of Classification Search .............. 370/395.2, 370/395.21, 442, 337, 357, 468, 458; 398/8, 398/98–103, 111
See application file for complete search history.

(56) References Cited

U.S. PATENT DOCUMENTS

| | | | |
|---|---|---|---|
| 6,205,154 B1 * | 3/2001 | Schmidt et al. ............. 370/458 |
| 6,370,154 B1 * | 4/2002 | Wickham ................... 370/463 |
| 6,750,687 B1 * | 6/2004 | Klecka, III ................. 327/153 |
| 6,975,588 B1 * | 12/2005 | Katukam et al. ............ 370/222 |
| 7,167,483 B1 * | 1/2007 | Sharma et al. .............. 370/442 |
| 7,272,116 B1 * | 9/2007 | Houchen .................... 370/258 |
| 2002/0015402 A1 * | 2/2002 | Hughes et al. .............. 370/347 |
| 2002/0051446 A1 * | 5/2002 | Klausmeier et al. ......... 370/386 |
| 2003/0112831 A1 * | 6/2003 | Williams .................... 370/535 |
| 2004/0165540 A1 * | 8/2004 | Acharya et al. ............. 370/252 |
| 2004/0190444 A1 * | 9/2004 | Trudel et al. ................ 370/224 |
| 2005/0254421 A1 * | 11/2005 | Galou et al. ................ 370/230 |

* cited by examiner

*Primary Examiner*—Kwang B Yao
*Assistant Examiner*—Kenan Cehic
(74) *Attorney, Agent, or Firm*—Murphy & King, P.C.

(57) ABSTRACT

A method, computer software program, and system provides automatic selection of time slots in time-division multiplexed connections. A network is mapped, and source and destination nodes are selected, as well as a route between them. Appropriate time slots are selected in a time-division multiplexed signal between the selected nodes, and a connection between the two nodes is automatically created, based at least in part on information related to the selected routes and time slots.

26 Claims, 9 Drawing Sheets

UPSR

GENERIC SONET/SDH TIME SLOT SELECTION ALGORITHM

TECHNICAL FIELD

The presently invention generally relates to an algorithm that provides a generic solution to automatically creating end-to-end Time Division Multiplexing (TDM) connections, and, more specifically, relates to the use of such an algorithm in, for example, in connecting pure SONET, pure SDH, or hybrid networks.

BACKGROUND

Time Division Multiplexing (TDM), in general, is a method for sending multiple digital signals along a single telecommunications pathway. In general, this is accomplished by deriving two or more apparently simultaneous channels from a given frequency spectrum by interleaving pulses, representing bits, from different channels. In some TDM systems, successive pulses represent bits from successive channels. In other systems different channels take turns using the channels for a group of successive pulse-times (a so-called "time slot"). A primary usage for TDM is the optimal transmission and switching of digitally encoded speech signals within a circuit-switched network, for example, a telecommunications network.

The development of modern optical networks was driven by a specific set of requirements. The first is synchronicity—all clocks in the system must align with a reference clock. Second, traffic must be routed from end exchange to end exchange without any concern for intermediate exchanges, where the bandwidth can be reserved at a fixed level for a fixed period of time. Next, frames of any size must be allowed to be removed or inserted into an existing frame of any size. The network must also be easily manageable, with the capability of transferring management data across the network links, provide a high level of recovery from faults, provide high data rates by multiplexing any size frame, limited only by technology, and minimize the occurrence of bit rate errors. Out of these requirements arose SONET and SDH, which became the two standards used for TDM connections.

SONET is a standard for connecting fiber-optic transmission systems, in particular, optical telecommunications systems, and it used primarily in the United States and Canada. SONET was proposed by Bellcore in the middle 1980s and is now an ANSI standard. SONET defines interface standards at the physical layer of the OSI seven-layer model. The standard defines a hierarchy of interface rates that allow data streams at different rates to be multiplexed. SONET establishes Optical Carrier (OC) levels from 51.8 Mbps (about the same as a T-3 line) to 2.48 Gbps. Prior rate standards used by different countries specified rates that were not compatible for multiplexing. With the implementation of SONET, communication carriers throughout the world can interconnect their existing digital carrier and fiber optic systems.

SDH is the international equivalent of SONET and was standardized by the International Telecommunications Union (ITU). SDH is an international standard for synchronous data transmission over fiber optic cables. SDH defines a standard rate of transmission at 155.52 Mbps, which is referred to as STS-3 at the electrical level and STM-1 for SDH. STM-1 is equivalent to SONET's Optical Carrier (OC) levels-3.

Employing these standards in the designing and provisioning TDM connections in a network is one of the major tasks in a telecommunications carrier's daily operations. However, this task is complex and tedious, as it requires engineers to have detailed knowledge not only of TDM connections, but also of the architecture of the specific network elements that are to be connected.

Traditionally, creating these connections involves breaking down the larger network into subnetworks, creating connections within each of the subnetworks, and then combining the subnetwork connections as necessary. The drawbacks to this technique become obvious when creating an end-to-end connection that traverses multiple subnetworks. Since each subnetwork connection is created independently, linking them all together usually requires manually configuring the building of the interconnections, as well as potentially requiring judgment calls on the part of the engineer.

Thus, there exists a need for a technique that serves to unify the process of connection creation from an aggregation of subnetwork creations into a complete and coherent process. This new technique must take into account the special requirements of the subnetworks, while automating and clarifying the connection generation process and removing potentially idiosyncratic manual configuration from the equation.

SUMMARY

Automating the process of creating a TDM connection becomes a two-stage process. First, possible routes from the source physical termination point (PTP) to the destination physical termination point (PTP) must be mapped, based upon information such as existing topological links, protection level, and routing instructions. Second, proper time slots within the TDM signal must be selected, and appropriate connections must be created, subject to the routes determined in the first stage. Automation of both steps results in fully automated connection creation.

The mapping of the available routes is the simpler of the two stages. Given any two nodes in a network, a path is a route taken by a signal from a source node to a destination node. For example, a telecommunications switching station may be considered a node. A collection of all paths between two nodes is referred to as a "path group" between the source node and the destination node. In a path group, one path may be assigned as a primary path, with other paths becoming secondary paths. A more detailed hierarchy may also be employed. These alternative paths may be used to reach the destination in case the primary path fails or is otherwise rendered unusable. For example, physical damage or protective switching may invalidate a primary path.

A connection route is a collection of path groups. A connection route may have multiple sources and multiple destinations. These sources and destinations may be defined by the source and destination of each path group in the connection route.

Aggregating paths, path groups, and connection routes allows for the mapping of a given network. Given a source physical termination point and a destination physical termination point, a connection route between the two may be determined, the connection route made up of various path groups, which in turn are made up of a collection of paths. These paths may be made up of topological (physical) connections between nodes in the network, and include restrictions such as protection level and direction. Any restrictions imposed by the topology of a network (for example, lack of a physical link between nodes in the connection route) are included in this definition, and serve to limit the availability of a given connection route. The restrictions upon the crossconnections are less rigid and subject to the nature of the network itself.

The final step in the network-mapping stage is the determination of an optimal connection route. This may be accomplished by assigning a positive cost value to each path. Concordantly, each path group, and thus each connection group, receives an associated cost. Thus, the desirability of a given path varies inversely with the associated cost. The application of these costs, as well as the calculation of the minimum-cost route, may be accomplished in a number of ways, for example by an algorithm that determines the characteristics of each path and assigns costs appropriately. Additional constraints, such as direction and protection level, also may be imposed as factors in the process of determining an optimal route from a specified source to a specified destination, and may be accomplished in any of a number of ways concordant with the state of the art.

Once the connection route hierarchy has been determined, the second stage begins. The appropriate connections must be made between nodes in the network, and appropriate timeslots within the TDM signal must be selected to be used in these connections. This is accomplished by building a graph of the free timeslots and applying a generic lowest-cost algorithm to find a path that connects source and destination timeslots of the connection with the lowest overall cost value. As above, the application of costs may be accomplished in any of a number of ways. As long as free time slots can be presented in the form of a free timeslot graph, the same lowest cost timeslot calculations apply to both SONET and SDH. In fact, this fact is vital to the building of hybrid connections.

Because SONET and SDH require that all clocks in a given system must align with a central clock, establishing a unidirectional connection requires information regarding three basic factors: rate of the connection, identifier and rate of the source time slot, and identifier and rate of the destination time slot. Once these three factors are know, the task of calculating the appropriate connections becomes the four-step process of selecting the connection rate on each node in the connection, collecting free timeslot information for all nodes involved in the connection, selecting at least one free time slot for each node in the connection based upon the determined criteria, and then creating the crossconnections for the timeslots along the routes defined in the previous stage. This last step may be accomplished in any of a number of ways, for example, by creating a connection information object that can be processed by a connection manager that would then actually create the necessary connections.

BRIEF DESCRIPTION OF THE DRAWINGS

The above described features and advantages will be more fully appreciated with reference to the detailed description and figures, in which.

DETAILED DESCRIPTION

The present invention relates to a generic method for automatically selecting time slots in Time-Division Multiplexed (TDM) connections, such as SONET and SDH. The networks and connections described herein are made up of network nodes, which are also referred to as network elements, which are connected together to form said network. Given a specific source and destination, the network between these two nodes is mapped, and routes are automatically selected for transmitting the information, and appropriate time slots within the TDM signal are automatically determined. The network elements then serve as cross-connects along the determined route, automatically assigning the information to the selected timeslots.

Figure 1:
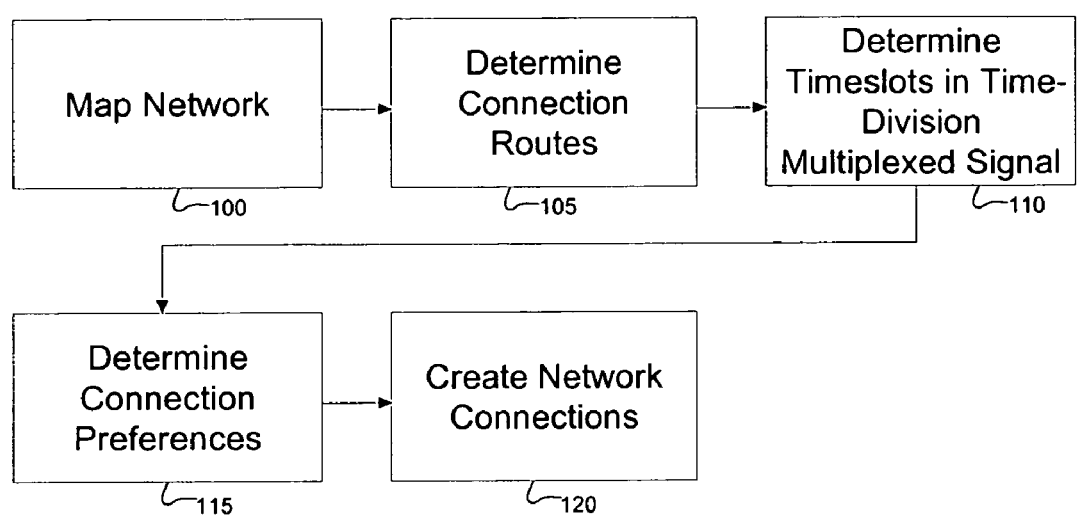
FIG. 1 depicts a flow chart detailing the overall steps of the process, according to an embodiment of the present invention.

An overall representation of the process is depicted in FIG. 1. In step 100, the topology of the network is mapped between the source and destination network elements, including information such as protection levels, access restrictions, and direction. This step may be accomplished in any way according to the state of the art. Following the mapping of the network, a route between the source and the destination is determined.

Figure 2:
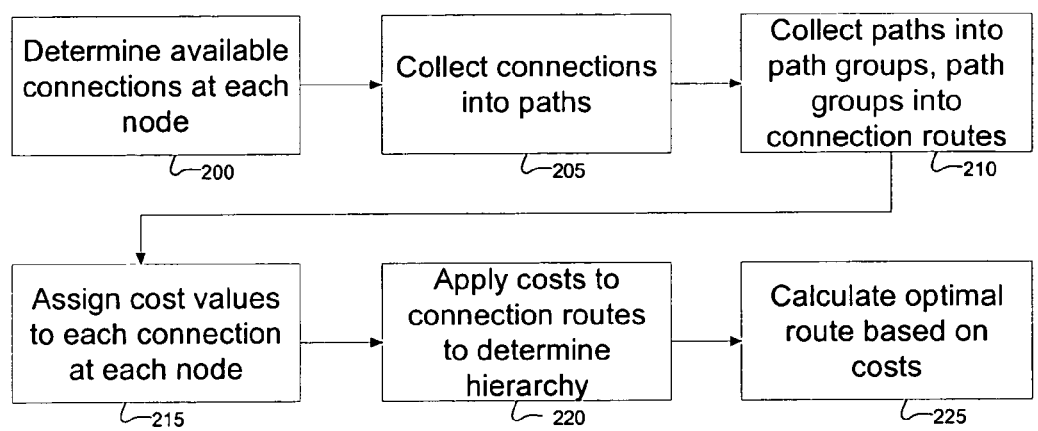
FIG. 2 depicts a flow chart detailing one implementation of the mapping of a network, according to an embodiment of the present invention.

FIG. 2 depicts a flow chart detailing the mapping of the network and the determination of the connection routes, according to one embodiment of the present invention. Referring to FIG. 2, step 200, in one embodiment of the present invention, the mapping of the network begins by determining the set of all available connections that link a source network element and a destination network element. This set may include the sets of connection that link a plurality of sources to a plurality of destinations. Given a specific source and a specific destination, the set of connections between them is called a path. In step 210, all paths that link between a specific source and destination are collected into path groups. These path groups are then further collected into connection routes, by these definitions may have multiple sources and multiple destinations. Unless stated otherwise, the connection routes referred to in the following embodiments consist of a single path.

Once the paths have been collected into path groups and the path groups have been collected into connection routes, a hierarchy may be established among the routes, so a particular route from a source to a destination may be selected. In one embodiment of the present invention, this is accomplished by assigning a cost to each connection between network elements, as shown in step 215. For example, a connection through a specific type of network element may be preferred, and thus connections to that network element may have a lower cost associated with them than those connecting with a different type of network element. In step 220, the costs for each connection route are aggregated in this manner, establishing a hierarchy, with the routes ranked according to the determined costs. In this way, an optimal connection route between a source and a destination may be determined.

Referring to FIG. 1, according to an embodiment of the present invention, the next step in the process is the determination of appropriate time slots in the TDM signal. This includes creating a free time slot graph, calculating the costs of time slots, and determining a lowest-cost path. These steps are further detailed in FIG. 3.

Figure 3:
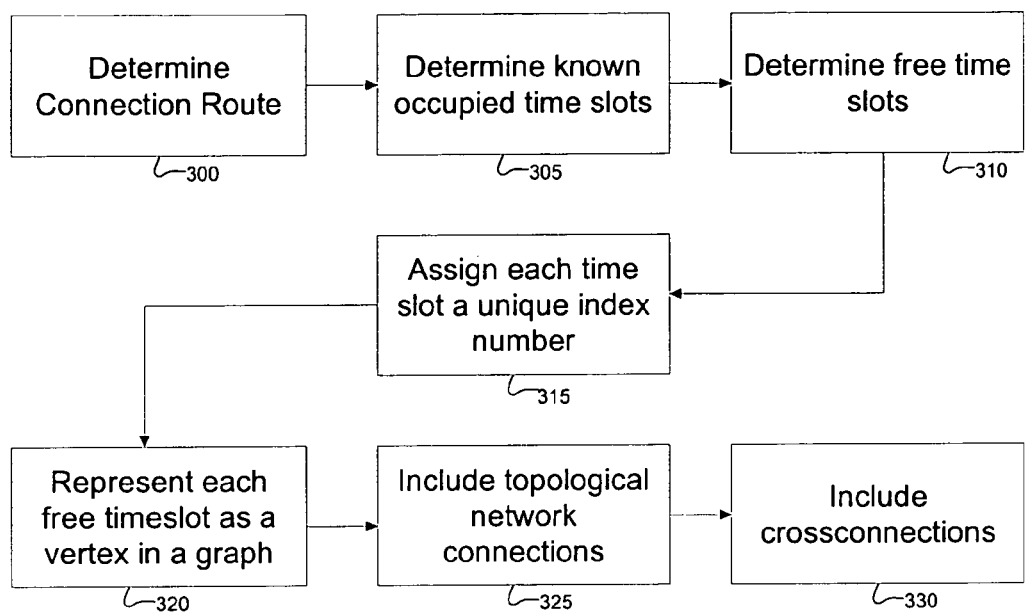
FIG. 3 depicts a flow chart detailing the creation of a time slot graph, according to an embodiment of the present invention.

Referring to FIG. 3, step 300, the determination of connection routes is the first step in this process, according to one embodiment of the present invention, as illustrated in FIG. 2. Given a mapped network, the state of the art allows for the determination of occupied time slots, as in step 305. Concordantly, it is possible from this information to calculate all free time slots in step 310. Once these time slots are calculated, however, there exists a need for a generic method for acting upon them independent of the connection type, be it SONET, SDH, or hybrid. According to an embodiment of the present invention, this can be accomplished by assigning a unique index number for each time slot, as in step 315. This index number may, for example, be chosen such that it includes bandwidth information in the bitset and simplify necessary calculations in this manner. After the calculations are accomplished, the index numbers may be translated back into a form recognizable by the network elements for the purposes of creating the requisite crossconnections.

Following the calculation of free timeslots and the assignment of unique index numbers, the next step includes the creation of a free time slot graph, according to an embodiment of the present invention. Step 320 depicts a preliminary first step in the creation of this graph, which, according to an embodiment of the present invention, includes depicting each free timeslot as a vertex in a graph. These vertices are then connected in step 325 by the mapped topological network connections, with crossconnections included in step 330. The graph is built dynamically, allowing the algorithm to properly scale to handle networks with large numbers of nodes.

Figure 4:
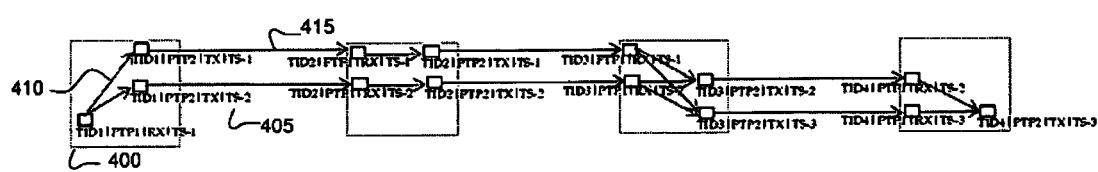
FIG. 4 depicts an exemplary diagram of a time slot graph, according to an embodiment of the present invention.

FIG. 4 depicts an exemplary free time slot graph. The network elements 400 are drawn to contain the free time slots 405, along with the associated unique index numbers 405. These index numbers may include information such as connection type, connection speed, and bandwidth. The crossconnections 410 between timeslots within the network elements and the topological network connections 415 between network elements.

Figure 5:
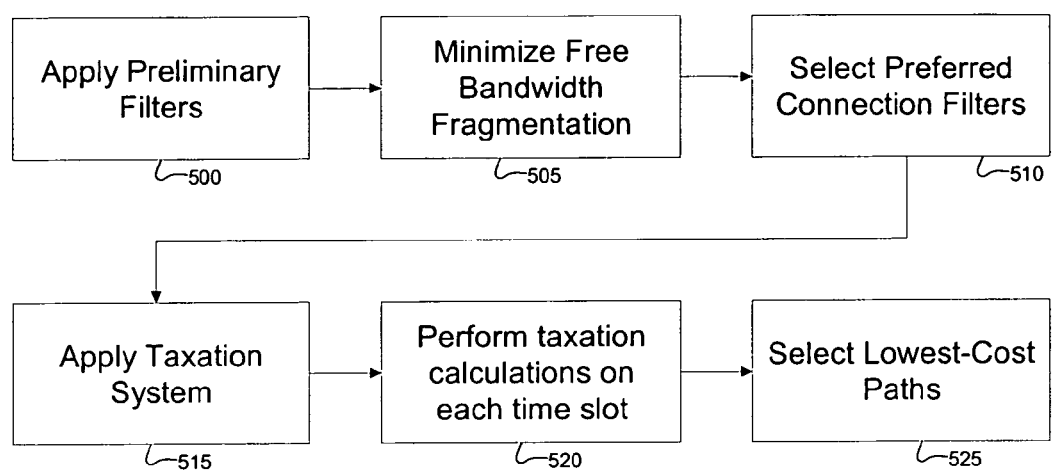
FIG. 5 depicts a flow chart detailing the calculation of the time slot costs and selecting appropriate time slots, according to an embodiment of the present invention.

FIG. 5 depicts a flow chart representing the next step in the determination of appropriate free time slots, according to an embodiment of the present invention. In step 500, initial filters are applied to the set of time slots. For example, if a specific slot number is known for a given network element, it may be used immediately. Additionally, if a given network element has both transmit and receives roles in a connection route, and if the process is set up so that a given element has only one time slot number, then any noncompliant time slots may be filtered out of the graph.

Once the initial filters have been applied, further calculations may be performed (as in step 505) to achieve the design advantages associated with automated free time slot selection. For example, these calculations may be based upon minimizing free bandwidth fragmentation, utilizing more efficient connection protocols, and appropriate assignment of time slots. This may include selecting a time slot at the destination that is closest in number to the source time slot, or using Time-Slot Assignment, a protocol that allows for flexible assignment for add-dropped signals, as shown in steps 510.

Following the application of filters, a cost system is applied to each possible timeslot choice in step 515. For example, a slot number assignment that wastes bandwidth, or does not use the TSA protocol, may incur a higher cost. If the destination time slot number is smaller than the source time slot number, then a rebate may be applied. In step 520, these calculations are performed on each possible time slot, and the lowest-cost path is selected in step 525. This method is similar to the one employed in determining the least costly connection route in the mapping stage of the process.

Figure 6:
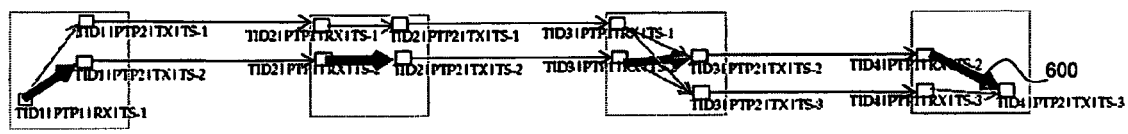
FIG. 6 depicts an exemplary diagram of a lowest-cost path, according to an embodiment of the present invention.

FIG. 6 depicts an exemplary time slot graph incorporating the results of the free time slot calculations. The selected crossconnections 600 (shown as bolded arrows) link the time slots selected by the above method.

Figure 7:
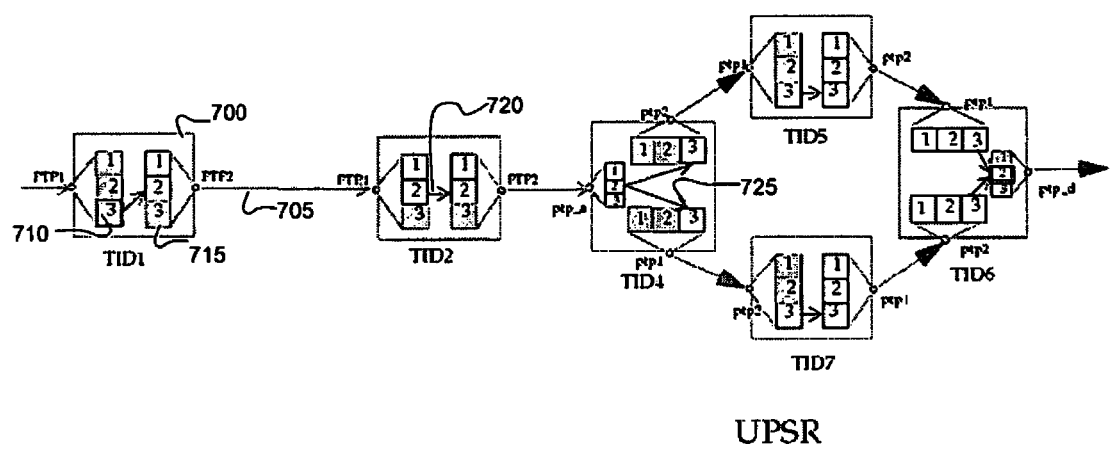
FIG. 7 depicts an exemplary diagram including multiple paths from a given source to a given destination, according to an embodiment of the present invention.

The above method may be extended to connection routes comprising multiple paths, a free time slot graph for which is shown in FIG. 7, according to an embodiment of the present invention. As before, the network elements 700 are connected via network connections 705. Free time slots 710 and occupied time slots 715 are illustrated within the network elements. Crossconnections link time slots together, both singly 720, and in the case of multiple available paths groups 725. The calculations for multiple paths are similar to those employed in the presence of a single path, except that the cost calculations are simply applied to every available path group, in addition to the calculations performed within the path groups that were previously shown.

Figure 8:
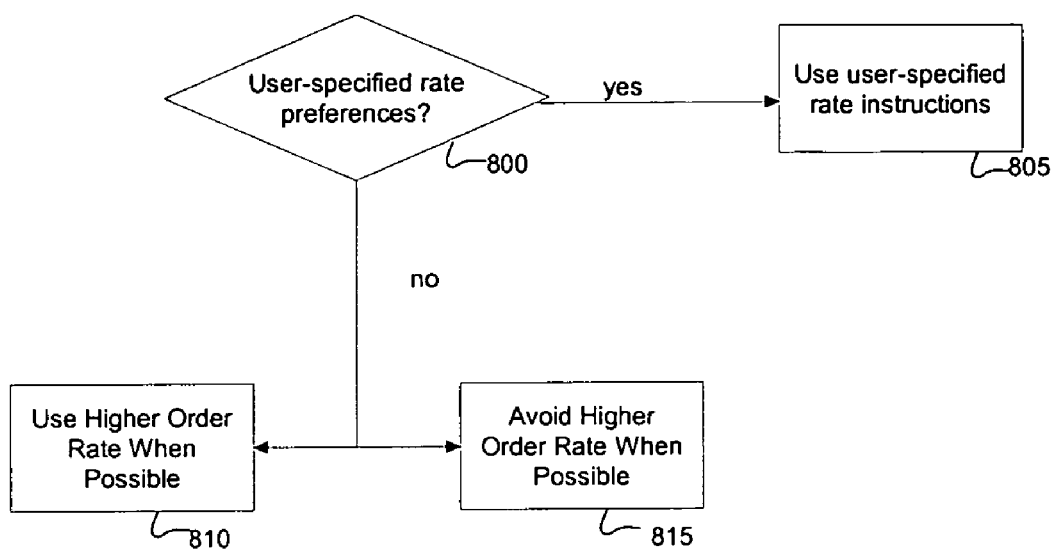
FIG. 8 depicts a flow chart detailing the incorporation of connection rate choice into the creation of the network connections, according to an embodiment of the present invention.

Referring to FIG. 1, according to an embodiment of the present invention, the next step in the process includes the determination of connection preferences. FIG. 8 depicts a flow chart representing a user-interaction in the network connection creation step, according to another embodiment of the present invention.

In step 800, the user is allowed to specify rate preferences, for example for each network element. This choice would override the default logic associated with that network element, as in step 805. If the user does not provide input regarding rate preferences, default logic may be used, for example choosing to employ higher order rate whenever possible 810, or avoiding a higher rate when possible 815.

Figure 9:
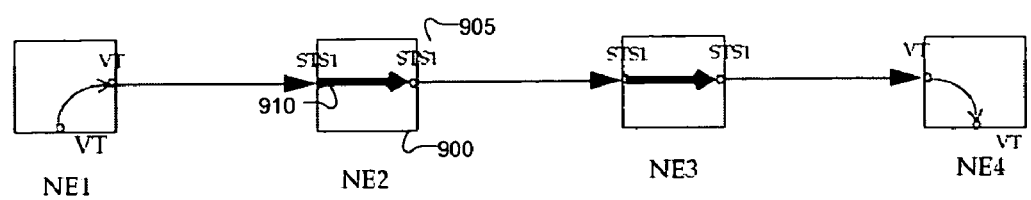
FIG. 9 depicts exemplary diagrams detailing the employment of connection rate choice in the creation of the network connections, according to an embodiment of the present invention.
Figure 9:
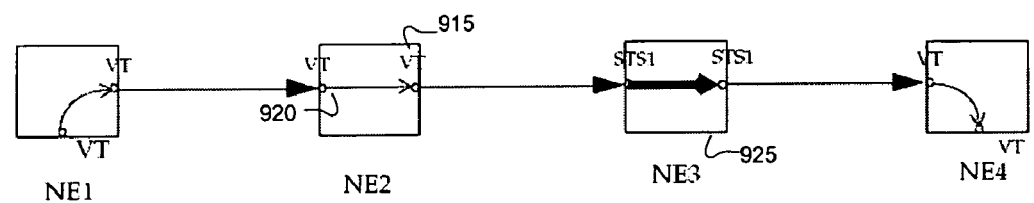

FIG. 9 depicts an exemplary diagram illustrating various crossconnection types, wherein network element 900 has access to both STS1- and VT-type crossconnections, with STS1 being a higher-order rate of VT. If the user or the default logic specifies that the higher order rate is to be used in network element 2, then STS1 905 is chosen, and a crossconnection 910 is created. If the user or default logic specifies that the lower-order rate VT 915 be used, then that crossconnection 920 is created. In this diagram, other network elements 925 only have access to the listed crossconnection type.

Referring to FIG. 1, the final step in the process according to an embodiment of the present invention is the creation of network connection. This may be accomplished, for example, by compiling the information calculated in the previous steps into a crossconnection object that is capable of being processed by a connection manager, which would, in turn, create the necessary crossconnections.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

In particular, it will be apparent that while particular methods have been illustrated and while particular processing steps have been shown, numerous variations are possible and contemplated by the applicants. In particular, a number of embodiments of the present invention are described as incorporating SONET. Although, for convenience, only SONET embodiments are explicitly described, one of skill in the art would recognize that all such embodiments may incorporate SDH and would understand how to incorporate SDH in such embodiments. Therefore, wherever SONET is used in this document, the use of either SONET or SDH is intended and the present invention is to be understood to encompass both SONET and SDH.

What is claimed is:

1. A method for creating time-division multiplexed connections, comprising the steps of:
   mapping a network;
   specifying nodes between which to transmit a signal;
   collecting all communication paths between two nodes among the specified nodes as a path group;
   establishing a hierarchy among connection routes, wherein the connection routes are a collection of path groups;
   determining and choosing connection routes through the network between all the specified nodes based on the established hierarchy;
   automatically determining and choosing appropriate time slots in a time-division multiplexed signal between the specified nodes, wherein the appropriate time slots comprise free time slots, each having an associated unique index number;
   wherein the determination of appropriate time slots includes the creation of a representation of a plurality of the free time slots by depicting each free time slot as a vertex in a time slot graph;
   wherein choosing of appropriate time slots includes automatically selecting vertices from among the plurality of the available free time slots by incorporating the determined appropriate time slots in the time slot graph; and
   creating a connection between the specified nodes in alignment with a central clock based upon at least a portion of the determined connection routes and the appropriate time slots, wherein the establishing of the created connection utilizes (a) transmission rate of the connection, (b) path identifier and transmission rate of a source time slot, and (c) path identifier and transmission rate of a destination time slot.

2. The method of claim 1, wherein the mapping of the network includes information relating to the topology of the network, protection levels, and security settings.

3. The method of claim 2, wherein the included information is applied to the choice of the connection routes.

4. The method of claim 1, wherein the choice of connection route is determined at least in part by applying a cost to each available connection route, and at least partially using said cost to determine the choice of connection routes.

5. The method of claim 1, wherein the choice of free time slots is determined at least in part by applying a cost to each free time slot, and at least partially using said cost to determine the choice of free time slots.

6. The method of claim 1, wherein the creation of the connection is influenced by preset preferences.

7. The method of claim 6, wherein the preferences are set by a user.

8. The method of claim 6, wherein the preferences relate to transmission rates available in the network.

9. The method of claim 6, wherein the connection is created by a non-transitory computer readable medium encoded with a computer program.

10. The method of claim 1, wherein the connection is created by a non-transitory computer readable medium encoded with a computer program.

11. A non-transitory computer readable medium encoded with a computer program having computer program logic therein that causes a computer to create time-division multiplexed connections, this creation comprising the steps of:
   mapping a network;
   receiving input related to the specification of nodes between which to transmit a signal;
   collecting all communication paths between two nodes among the specified nodes as a path group, wherein one path serves as a primary path and the remaining paths serve as alternatives in the event the primary path is rendered unusable;
   establishing a hierarchy among connection routes, wherein the connection routes are a collection of path groups;
   determining output related to choosing connection routes through the network between all the specified nodes based on the established hierarchy;
   automatically determining output related to appropriately selecting time slots in a time-division multiplexed signal between the specified nodes, wherein the time slots comprise free time slots, each having an associated unique index number;
   wherein the determination of appropriate time slots includes the creation of a representation of a plurality of the free time slots by depicting each free time slot as a vertex in a time slot graph;
   wherein choosing of appropriate time slots includes automatically selecting vertices from among the plurality of the available free time slots by incorporating the determined appropriate time slots in the time slot graph; and
   creating a connection between the specified nodes in alignment with a central clock based upon at least a portion of the determined connection routes and the appropriate time slots, wherein the establishing of the created connection utilizes (a) transmission rate of the connection, (b) path identifier and transmission rate of a source time slot, and (c) path identifier and transmission rate of a destination time slot.

12. The non-transitory computer readable medium encoded with a computer program of claim 11, wherein the mapping of the network includes information relating to the topology of the network, protection levels, and security settings.

13. The non-transitory computer readable medium encoded with a computer program of claim 12, wherein the included information is applied to the choice of the connection routes.

14. The non-transitory computer readable medium encoded with a computer program of claim 11, wherein the choice of connection route is determined at least in part by applying a cost to each available connection route, and at least partially using said cost to determine the choice of connection routes.

15. The non-transitory computer readable medium encoded with a computer program of claim 11, wherein the choice of free time slots is determined at least in part by applying a cost to each free time slot, and at least partially using said cost to determine the choice of free time slots.

16. The non-transitory computer readable medium encoded with a computer program of claim 11, wherein the creation of the connection is influenced by preset preferences.

17. The non-transitory computer readable medium encoded with a computer program of claim 16, wherein the preferences are set by a user.

18. The non-transitory computer readable medium encoded with a computer program of claim 16, wherein the preferences relate to transmission rates available in the network.

19. A system for creating time-division multiplexed connections, comprising:
- a processor operable to execute computer program instructions;
- a memory operable to store computer program instructions executable by the processor; and
- computer program instructions stored in the memory and executable to perform the steps of:
- mapping a network;
- receiving input related to the specification of nodes between which to transmit a signal;
- collecting all communication paths between two nodes among the specified nodes as a path group, wherein one path serves as a primary path and the remaining paths serve as alternatives in the event the primary path is rendered unusable;
- establishing a hierarchy among connection routes, wherein the connection routes are a collection of path groups;
- determining output related to choosing connection routes through the network between all the specified nodes based on the established hierarchy;
- automatically determining output related to appropriately selecting time slots in a time-division multiplexed signal between the specified nodes, wherein the time slots comprise free time slots, each having an associated unique index number;
- wherein the determination of appropriate time slots includes the creation of a representation of a plurality of the free time slots by depicting each free time slot as a vertex in a time slot graph; and
- wherein determining output related to appropriately selecting time slots includes automatically selecting vertices from among the plurality of the available free time slots by incorporating the determined appropriate time slots in the time slot graph; and
- creating a connection between the nodes aligned with a central clock based upon at least a portion of the determined connection routes and the appropriate time slots, wherein the establishing of the created connection utilizes (a) transmission rate of the connection, (b) path identifier and transmission rate of a source node, and (c) path and transmission rate of a destination time slot and are used in the steps of (d) selecting a transmission rate on each node in the connection; (e) collecting the free-time slot information for all nodes involved in the connection; (f) selecting at least one free time slot for each node in the connection based upon the determined outputs, and (g) creating cross-connections for the selected free timeslots along the paths defined in a previous stage.

20. The system of claim 19, wherein the mapping of the network includes information relating to the topology of the network, protection levels, and security settings.

21. The system of claim 20, wherein the included information is applied to the choice of the connection routes.

22. The system of claim 19, wherein the choice of connection route is determined at least in part by applying a cost to each available connection route, and at least partially using said cost to determine the choice of connection routes.

23. The system of claim 19, wherein the choice of free time slots is determined at least in part by applying a cost to each free time slot, and at least partially using said cost to determine the choice of free time slots.

24. The system of claim 19, wherein the creation of the connection is influenced by preset preferences.

25. The system of claim 24, wherein the preferences are set by a user.

26. The system of claim 24, wherein the preferences relate to transmission rates available in the network.

* * * * *